United States Statutory Invention Registration [19]

[11] Reg. Number: H835

Sharpe [43] Published: Nov. 6, 1990

[54] SPECIAL TOOL TO SECURE PANEL FASTENERS WITH SEATS INSTALLED

[76] Inventor: Gordon C. Sharpe, 1975 S. Buena Vista, Apache Junction, Ariz. 85220

[21] Appl. No.: 374,594

[22] Filed: Jun. 26, 1989

Related U.S. Application Data

[63] Continuation-in-part of Ser. No. 215,137, Jul. 5, 1988, abandoned.

[51] Int. Cl.[5] ..... B25B 31/00

[52] U.S. Cl. ..... 81/450

[58] Field of Search ..... 81/177.6, 177.2, 177.7, 81/436, 449, 450

[56] References Cited

U.S. PATENT DOCUMENTS

| | | | |
|---|---|---|---|
| 819,289 | 5/1906 | Kootz et al. . | |
| 1,390,748 | 11/1921 | Heintzman . | |
| 2,138,725 | 11/1938 | Brouhard | 81/177.7 X |
| 2,431,628 | 11/1947 | Waarich | 81/436 |
| 2,581,899 | 8/1945 | Bailey . | |
| 3,540,342 | 11/1970 | Vaughn | 81/436 X |
| 4,028,968 | 6/1977 | DeAmicis | 81/450 |
| 4,146,073 | 3/1979 | Lliteras | 81/436 |
| 4,338,835 | 7/1982 | Simons | 81/436 |

*Primary Examiner*—Charles T. Jordan
*Assistant Examiner*—Michael J. Carone
*Attorney, Agent, or Firm*—Fredric L. Sinder; Donald J. Singer

[57] ABSTRACT

A fastener tool for tightening obstructed fasteners is disclosed. A handle and a blade made of flat metal are pivotably attached at two ends. One end of the blade is bent to form a tip having a generally straight outside edge for inserting into a fastener head. The edge may additionally include a substantially half circle projection from the middle of the line segment for use with cross-slotted or Phillips type fastener heads. The edge may also be slightly outwardly convex.

7 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

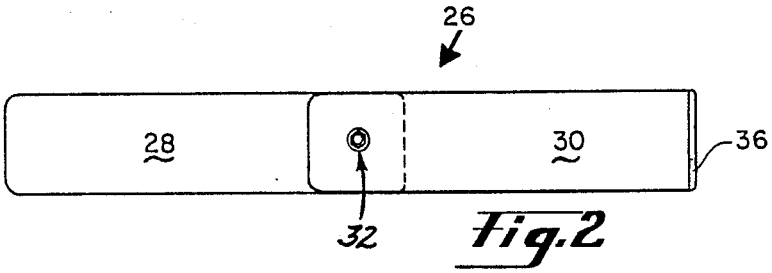
Fig. 2
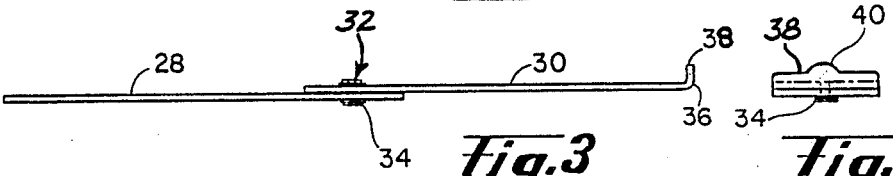
Fig. 3
Fig. 4
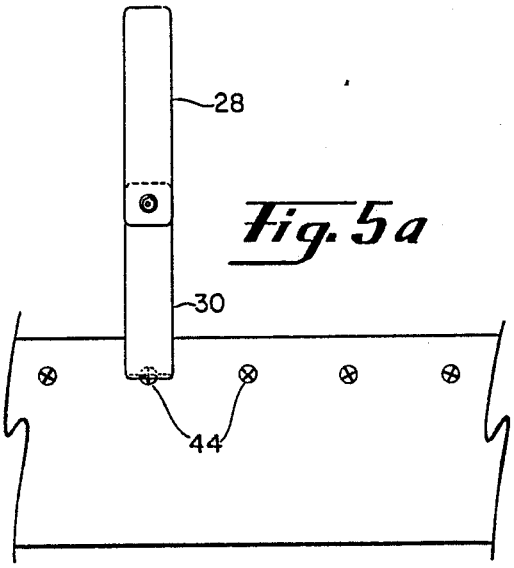
Fig. 5a
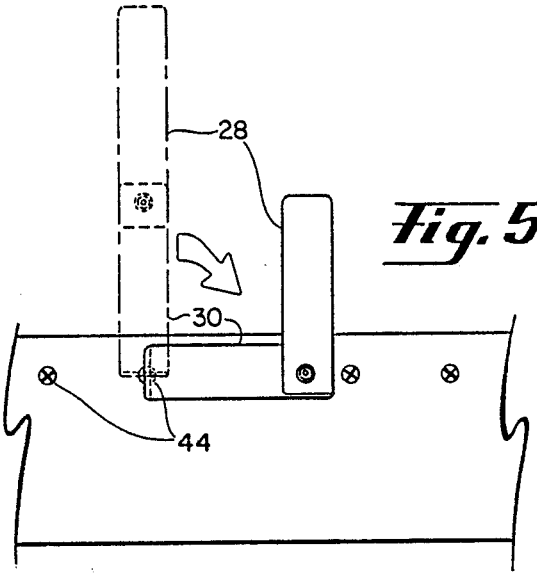
Fig. 5b

SPECIAL TOOL TO SECURE PANEL FASTENERS WITH SEATS INSTALLED

This application is a continuation-in-part of application Ser. No. 215,137, filed July 5, 1988, now abandoned.

The invention described herein may be manufactured and used by or for the Government of the United States for all governmental purposes without the payment of any royalty.

BACKGROUND OF THE INVENTION

The present invention relates generally to aircraft repair tools, and more specifically to a fastener tool for tightening obstructed fastener heads.

Fasteners used on aircraft, and in many other applications are often inaccessible to regular tools due to placement of other later installed parts. Attempted tightening of fasteners that become loose during normal use is impossible without lengthy and time consuming disassembly of the obstructing parts. This problem is particularly acute in trim and kick panel fasteners in single and dual seat jet aircraft. The fasteners often become loose typically requiring only a one-half turn to secure, but the one-half inch clearance between the panels and later installed seats and other parts blocks insertion of both regular tools and presently available specialty tools for use in confined spaces. Thus it is seen that there is a need for an improved tool and method for tightening fasteners that are otherwise inaccessible because obstructed by later installed parts.

It is therefore, a principal object of the present invention to provide an improved tool and method for tightening obstructed fasteners.

It is another object of the present invention to provide an improved tool suitable for use in confined spaces.

It is an advantage of the present invention that it is simple, straightforward, fast and easy to use.

SUMMARY OF THE INVENTION

In accordance with the foregoing objects and advantages, the present invention provides a novel fastener tool for tightening otherwise inaccessible fasteners. The unique discovery of the present invention is that the problems associated with limited access to fasteners due to later installed obstructing parts can be solved by using a two piece flat tool that swivels at the juncture of the two tool pieces to provide the needed rotation for tightening the fasteners.

Accordingly, the present invention is directed to an apparatus and method for using a tool for tightening fasteners comprising a handle and a blade, means for pivotably attaching the handle to the blade first end, wherein the blade second end is generally flat and bent transversely to its length substantially at a right angle to form a tip, and wherein the tip has an outside edge for inserting into a fastener head, the edge defining a generally straight line segment.

The length of the bent portion of the blade second end may be about three-eights inch.

The generally straight line segment defined by the tip edge may include a substantially half circle projection from the middle of the line segment.

The generally straight line segment defined by the tip edge may also be slightly outwardly convex.

The tool is used by inserting its tip into a fastener head and applying a force to the handle to thereby rotate the blade about the fastener head.

DESCRIPTION OF THE DRAWINGS

The present invention will be more clearly understood from a reading of the following detailed description in conjunction with the accompanying drawings wherein:

FIG. 2 is a plan view of a fastener tool according to the teachings of the present invention;

FIG. 3 is a side view of the fastener tool showing its turned blade tip;

FIG. 4 is an end view of the fastener tool showing the outside edge shape of the tip;

FIGS. 5*a* and 5*b* show the use of the fastener tool for tightening a loose fastener.

DETAILED DESCRIPTION

Figure 1:
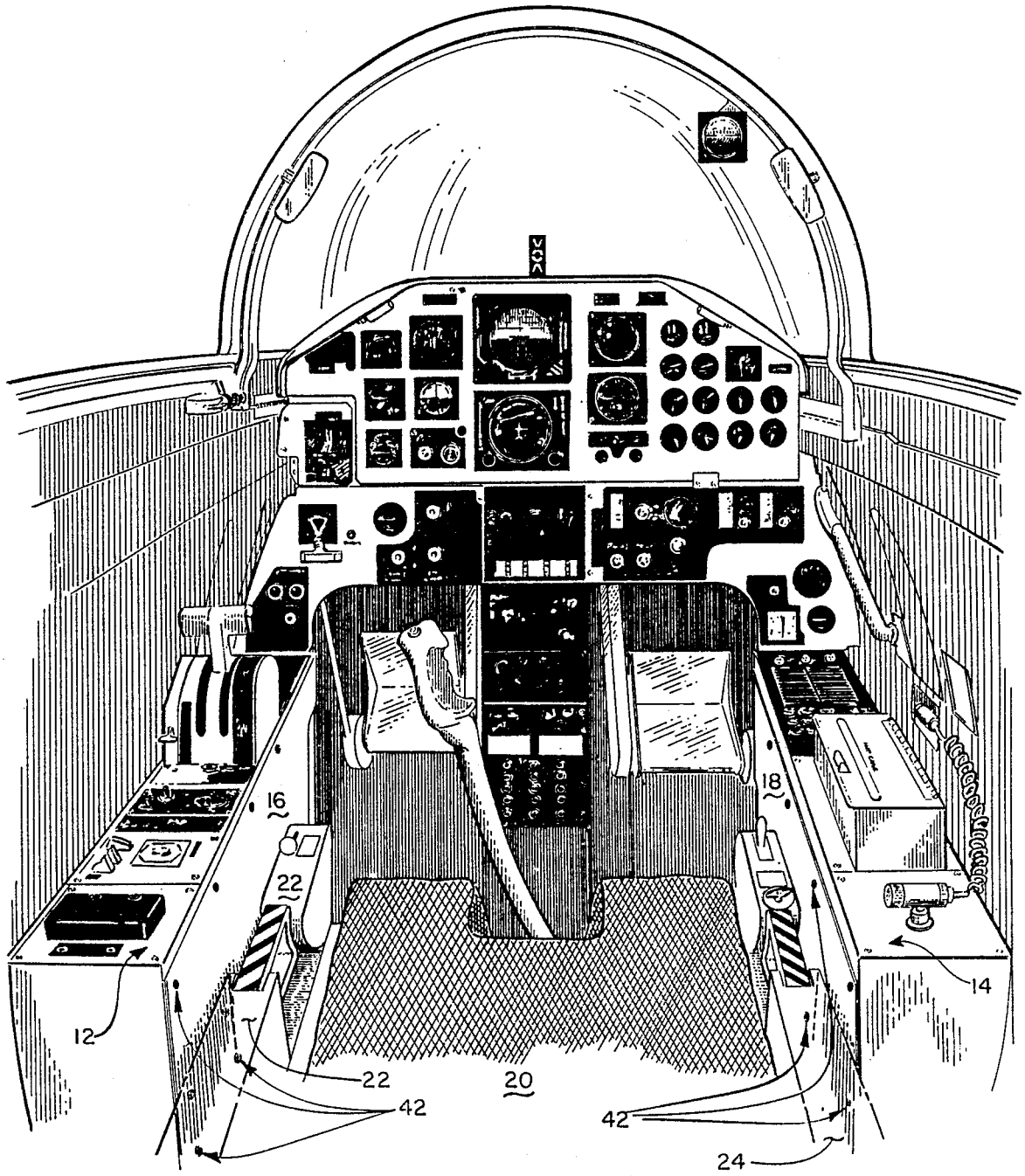
FIG. 1 is a behind-forward perspective view of the front cockpit of a T-38 jet aircraft showing typical locations of obstructed fasteners.

Referring now to FIG. 1 of the drawings, there is shown a behind-forward perspective view of a front cockpit 10 of a representative jet aircraft. The cockpit includes left and right consoles 12 and 14. Kick panels 16 and 18 cover the sides of consoles 12 and 14 and are fastened to the aircraft by fasteners 42. An ejection seat 20 fits between consoles 12 and 14. The sides and armrests 22 and 24 of ejection seat 20 rise up to become flush with panels 16 and 18. There is only about a one-half inch clearance for insertion of a tool between panels 16 and 18 and armrests 22 and 24.

FIGS. 2, 3 and 4 show respectively a plan, side and end view of a fastener tool 26 according to the teachings of the present invention. A handle 28 and blade 30, made of flat metal, are pivotably attached at two ends by a bolt 32 and nut 34. A second end of blade 30 is bent to form a tip 36. As shown in FIG. 4, an outside edge 38 of tip 36 is shaped to fit in a regular slot type fastener head or, aided by a semi-circular projection 40, in a cross-slotted or phillips type fastener head.

FIGS. 5*a* and 5*b* show fastener tool 26 used to tighten fastener 42 on cockpit kick panel 12. For clarity, obstructing ejection seat 20 and armrests 22 or 24 are not shown in this view. FIG. 5*a* shows tool 26 inserted into a head 44 of loose fastener 42. Rotating blade 30 by applying a force through handle 28, as shown in FIG. 5*b*. tightens fastener 42. A finger, or other slender object, may be inserted between panel 12 and seat 20 over the end of tool 26 to hold tip 36 in place in fastener head 44. Generally, only a quarter turn of blade 30 is required to successfully secure a loose fastener.

Figure 6:
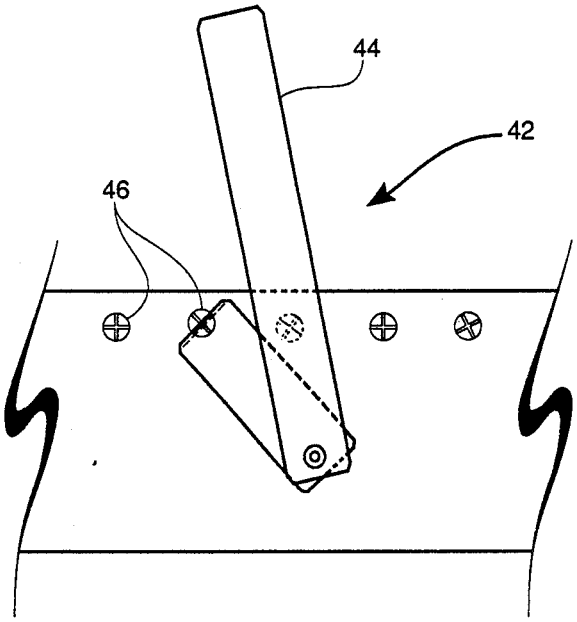
FIG. 6 show the use of a modified version of the fastener tool having an elongated handle for making full 360° degree turns of fasteners in obstructed locations.

FIG. 6 shows the use of a modified fastener tool 42 having an elongated handle 44 for making full 360° degree turns of fasteners 46 in obstructed locations.

For a typical jet aircraft, the preferred dimensions for tool 26 are about 5 inches in length for each of handle 28 and blade 30, and a $\frac{3}{8}$ inch height for the turned end of blade tip 36. For installations where a full 360° rotation of blade 30 may be required, handle 28 must be made longer than blade 30 to provide sufficient handle length to complete the 360° rotation, as shown in FIG. 5. The thickness of the handle 28 and blade 30 material is about 1/16 inch. Projection 40 is substantially a half circle of diameter about $\frac{1}{3}$ inch. These dimensions preserve the overall extreme thinness of the tool which is critical to its success.

Blade tip 36 may also be made slightly outwardly convex to facilitate its fit into other types of fastener heads.

The disclosed apparatus and method for tightening fastener heads successfully demonstrate the use of a thin two part twisting tool that provides a twisting force through interactive movement of its two parts. Although the disclosed use is specialized, it will find application in other areas where a twisting force has to be applied in a restricted area.

It is understood that modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

I claim:

1. A tool for tightening fasteners having fastener heads, comprising:

(a) generally flat blade having a first and a second and, a length and a thickness;

(b) a generally flat handle having a first end, a second end and a thickness equal to that of the blade;

(c) means for pivotably attaching the handle second end to the blade first end so that the blade can freely rotate 360° about the handle second end without obstruction;

(d) wherein the blade second end is bent transversely to its length substantially at a right angle to form a generally flat tip; and, (e) wherein the tip has an outside edge for inserting into a fastener head, the tip edge defining a generally straight line segment.

2. The tool according to claim 1, wherein the length of the bent portion of the blade second end is about three-eights inch.

3. The tool according to claim 1, wherein the generally straight line segment defined by the tip edge additionally includes a substantially half circle projection from the middle of the line segment, whereby the half circle projection can extend into a recessed portion of a Phillips-type fastener head to provide a better fit between the tip and the fastener head.

4. The tool according to claim 1, wherein the generally straight line segment defined by the tip edge is slightly outwardly convex, whereby the convex shape provides a better fit between the tip and a Phillips-type fastener head.

5. A method for tightening and for loosening fasteners having fastener heads wherein access to the fastener heads from above the heads is obstructed, comprising the steps of:

(a) providing a handle having a first end and a second end;

(b) providing a blade having a first end and a generally flat second end;

(c) providing means for pivotably attaching the handle second end to the blade first end;

(d) providing a tip made by bending the blade second end transversely to its length substantially at a right angle to form a tip, the tip having an outside edge defining a generally straight line segment; and, (e) inserting the tip into a fastener head and applying a force to the handle to thereby rotate the blade about the fastener head.

6. The method according to claim 5, wherein the generally straight line segment defined by the tip edge additionally includes a substantially half circle projection from the middle of the line segment.

7. The method according to claim 5, wherein the generally straight line segment defined by the tip edge is slightly outwardly convex.

* * * * *